(12) United States Patent
McCormack

(10) Patent No.: US 11,585,452 B2
(45) Date of Patent: Feb. 21, 2023

(54) FUEL NOZZLE WITH REDUCED FLOW TOLERANCE

(71) Applicant: Jimroy A. McCormack, Holland, MI (US)

(72) Inventor: Jimroy A. McCormack, Holland, MI (US)

(73) Assignee: Woodward, Inc., Fort Collins, CO (US)

( * ) Notice: Subject to any disclaimer, the term of this patent is extended or adjusted under 35 U.S.C. 154(b) by 376 days.

(21) Appl. No.: 16/702,240

(22) Filed: Dec. 3, 2019

(65) Prior Publication Data

US 2021/0164577 A1    Jun. 3, 2021

(51) Int. Cl.

| | |
|---|---|
| *F16K 15/06* | (2006.01) |
| *F16K 17/34* | (2006.01) |
| *F16K 17/30* | (2006.01) |
| *F16K 47/00* | (2006.01) |
| *B67D 7/36* | (2010.01) |
| *F02C 9/26* | (2006.01) |
| *F23R 3/28* | (2006.01) |

(52) U.S. Cl.
CPC ............. *F16K 15/063* (2013.01); *B67D 7/36* (2013.01); *F02C 9/263* (2013.01); *F16K 15/065* (2021.08); *F16K 17/30* (2013.01); *F16K 17/34* (2013.01); *F16K 47/0111* (2021.08); *F23R 3/28* (2013.01); *F05D 2220/32* (2013.01); *Y10T 137/7727* (2015.04); *Y10T 137/7931* (2015.04)

(58) Field of Classification Search
CPC ..... B67D 7/52; B67D 7/36; F17C 2205/0332; F17C 2205/0335; F17C 2205/0338; Y10T 137/7727; Y10T 137/7931; F16K 17/30; F16K 17/34; F16K 15/065; F16K 15/06; F16K 15/063; F16K 47/0111
See application file for complete search history.

(56) References Cited

U.S. PATENT DOCUMENTS

| | | | | |
|---|---|---|---|---|
| 2,207,285 | A | * | 7/1940 | Chapman ................. B67D 7/42 137/541 |
| 3,008,485 | A | * | 11/1961 | Johnson .................. F16K 27/02 137/542 |
| 3,608,575 | A | | 9/1971 | Jurisch et al. |

(Continued)

FOREIGN PATENT DOCUMENTS

| | | |
|---|---|---|
| DE | 32 14 040 | 10/1983 |
| DE | 34 31 677 | 3/1986 |

(Continued)

*Primary Examiner* — Atif H Chaudry
(74) *Attorney, Agent, or Firm* — Reinhart Boerner Van Deuren P.C.

(57) ABSTRACT

A fuel nozzle metering valve that includes a spool having an inlet port and an outlet flow port, and a retainer assembled to one end of the spool. A valve liner houses a portion of the spool. The spool is configured to move back and forth within the valve liner. The metering valve is biased in a closed position in which the outlet flow port is disposed entirely within the valve liner. The valve is opened when the spool slides within the valve liner such that some portion of the outlet flow port extends beyond an end of the valve liner. The retainer has a stepped portion configured to abut an end of the retainer at a fuel flow pressure below the expected maximum fuel flow pressure to be used in the fuel nozzle metering valve.

2 Claims, 3 Drawing Sheets

(56) References Cited

U.S. PATENT DOCUMENTS

| | | | |
|---|---|---|---|
| 3,718,283 A | 2/1973 | Fenne | |
| 3,727,636 A | 4/1973 | Simmons | |
| 3,728,859 A | 4/1973 | Seiler | |
| 3,808,800 A | 5/1974 | Taylor | |
| 3,986,795 A | 10/1976 | Kranc et al. | |
| 4,181,144 A * | 1/1980 | Landen | F02M 61/08 137/484.4 |
| 4,491,272 A * | 1/1985 | Bradley | F23D 11/26 239/104 |
| 4,665,943 A | 5/1987 | Medvick et al. | |
| 4,747,426 A * | 5/1988 | Weevers | F16K 15/063 137/220 |
| 5,417,054 A * | 5/1995 | Lee | F02B 77/04 239/406 |
| 5,685,333 A * | 11/1997 | Skaryd | F16K 15/063 137/514.5 |
| 6,443,182 B1 * | 9/2002 | Hathcock | F16K 15/063 137/514.5 |
| 6,644,031 B2 | 11/2003 | Lavie et al. | |
| 6,726,121 B1 | 4/2004 | Kienzler et al. | |
| 6,901,953 B2 | 6/2005 | D'Agostino et al. | |
| 7,422,166 B2 | 9/2008 | Hoffmann et al. | |
| 9,494,079 B2 | 11/2016 | Pousseo et al. | |
| 10,018,169 B2 | 7/2018 | Koeninger | |
| 2002/0059799 A1 * | 5/2002 | Lavie | F02C 7/232 60/714 |
| 2003/0093998 A1 * | 5/2003 | Michau | F23K 5/147 60/740 |
| 2016/0215891 A1 * | 7/2016 | Thomson | F16K 15/025 |
| 2019/0032811 A1 | 1/2019 | Brito | |

FOREIGN PATENT DOCUMENTS

| | | |
|---|---|---|
| EP | 1069377 A2 | 1/2001 |
| GB | 842940 | 7/1960 |
| GB | 2 064 647 | 6/1981 |
| WO | WO 2019/199851 A1 | 10/2019 |

* cited by examiner

FUEL NOZZLE WITH REDUCED FLOW TOLERANCE

FIELD OF THE INVENTION

This invention generally relates to fuel nozzles for jet engines.

BACKGROUND OF THE INVENTION

Gas turbines for jet engines typically incorporate fuel nozzles arranged in a circumferentially uniform pattern around the engine's axis where fuel is introduced into the combustor via the nozzles. Furthermore, fuel nozzles with a "wide" flow range may be equipped with flow metering valves to optimize low and high flow rate spray quality. Fuel is regulated with valve ports designed to satisfy customer required fuel flow rates. Flow passage geometric variation and valve displacement non-uniformity (hysteresis) contribute to flow variability in each fuel nozzle. Valves are typically spring loaded and are actuated with increasing fuel flow pressure, initially to open, and subsequently displacing in response to higher pressure values. Valve displacement is generally unimpeded throughout the full range of imposed fuel flow pressure.

Jet engine operation typically requires that the fuel nozzles have a minimum nozzle flow tolerance, especially at higher engine power settings. Embodiments of the invention described below provide a fuel nozzle which improves the state of the art with respect to minimum flow tolerance. These and other advantages of the invention, as well as additional inventive features, will be apparent from the description of the invention provided herein.

BRIEF SUMMARY OF THE INVENTION

In one aspect, embodiments of the invention provide a fuel nozzle metering valve that includes a spool having an inlet port and an outlet flow port, and a retainer assembled to one end of the spool. A valve liner which houses a portion of the spool. The spool is configured to move back and forth within the valve liner. The metering valve is biased in a closed position in which the outlet flow port is disposed entirely within the valve liner. The valve is opened when the spool slides within the valve liner such that some portion of the outlet flow port extends beyond an end of the valve liner. The retainer has a stepped portion configured to abut an end of the valve liner at a fuel flow pressure below the expected maximum fuel flow pressure to be used in the fuel nozzle metering valve.

In a particular embodiment, wherein the spool is configured to slide out of the valve liner when a fuel flow pressure from fuel flowing into the inlet port overcomes the closing bias on the metering valve. The retainer may be disc-shaped and, in certain embodiments, the stepped portion extends from a central region of the disc-shaped retainer. The stepped portion may be cylindrical or partially cylindrical.

In some embodiments, the valve liner is fixed within the fuel nozzle, and wherein the spool and retainer move relative to the valve liner. In a further embodiment, the metering valve is biased in a closed position by a spring. The spring may include a first end abutting a flange of the retainer and may have a second end abutting a flange of the valve liner.

In another aspect, embodiments of the invention provide a fuel nozzle check valve that includes a spool and a valve liner having an inlet port, and a retainer assembled to one end of the spool. A valve liner houses a portion of the spool. The spool is configured to move back and forth within the valve liner. The valve liner includes a valve liner port in fluid communication with an outlet flow port on the valve liner when the check valve is in the open position. The check valve is biased in a closed position in which the outlet flow port is disposed entirely within the valve liner. The valve is opened when the spool slides within the valve liner such that some portion of the outlet flow port opens to permit through flow. The retainer has a stepped portion configured to abut an end of the valve liner at a fuel flow pressure below the expected maximum fuel flow pressure to be used in the fuel nozzle check valve.

In a particular embodiment, the spool is configured to slide out of the valve liner when a fuel flow pressure from fuel flowing into the inlet port overcomes the closing bias on the check valve. The retainer may be disc-shaped and, in certain embodiments, the stepped portion extends from a central region of the disc-shaped retainer. The stepped portion may be cylindrical or partially cylindrical.

In some embodiments, the valve liner is fixed within the fuel nozzle, and wherein the spool and retainer move relative to the valve liner. In other embodiments, the check valve is biased in a closed position by a spring. In a particular embodiment, the spring has a first end abutting a flange of the retainer and a second end abutting a flange of the valve liner.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

For any given flow device operating at a set condition, the flow rate through the device is proportional to the square root of the pressure difference across the device. The flow rate is also proportional to the device's flow path area. Any variation in the area of the flow path will thus cause flow variation at any set condition. Therefore, conventional jet engine fuel nozzles, with integral flow metering valves or check valves, tend to introduce additional flow path variations, and corresponding flow rate variations, due to the dynamic nature of each valve in each fuel nozzle within the jet engine.

As will be described below, embodiments of the present invention provide improved flow tolerances for any fuel nozzle equipped with a check valve or a metering valve, especially at high flow rates where combustor and turbine durability and reliability are most sensitive to flow non-uniformity. One of ordinary skill in the art will be able to recognize, from the embodiments shown, that valve flow port design configuration, and limiting the maximum valve displacement that can occur prior to maximum pressure, assures that fixed flow circuit geometry is achieved at all pressure points greater than maximum displacement. In this scenario, valve spring behavior, valve port geometry and valve clearance effects become fixed features within the fuel nozzle. This acts to limit variations in the flow rate and reduces the flow tolerance.

Figure 1:
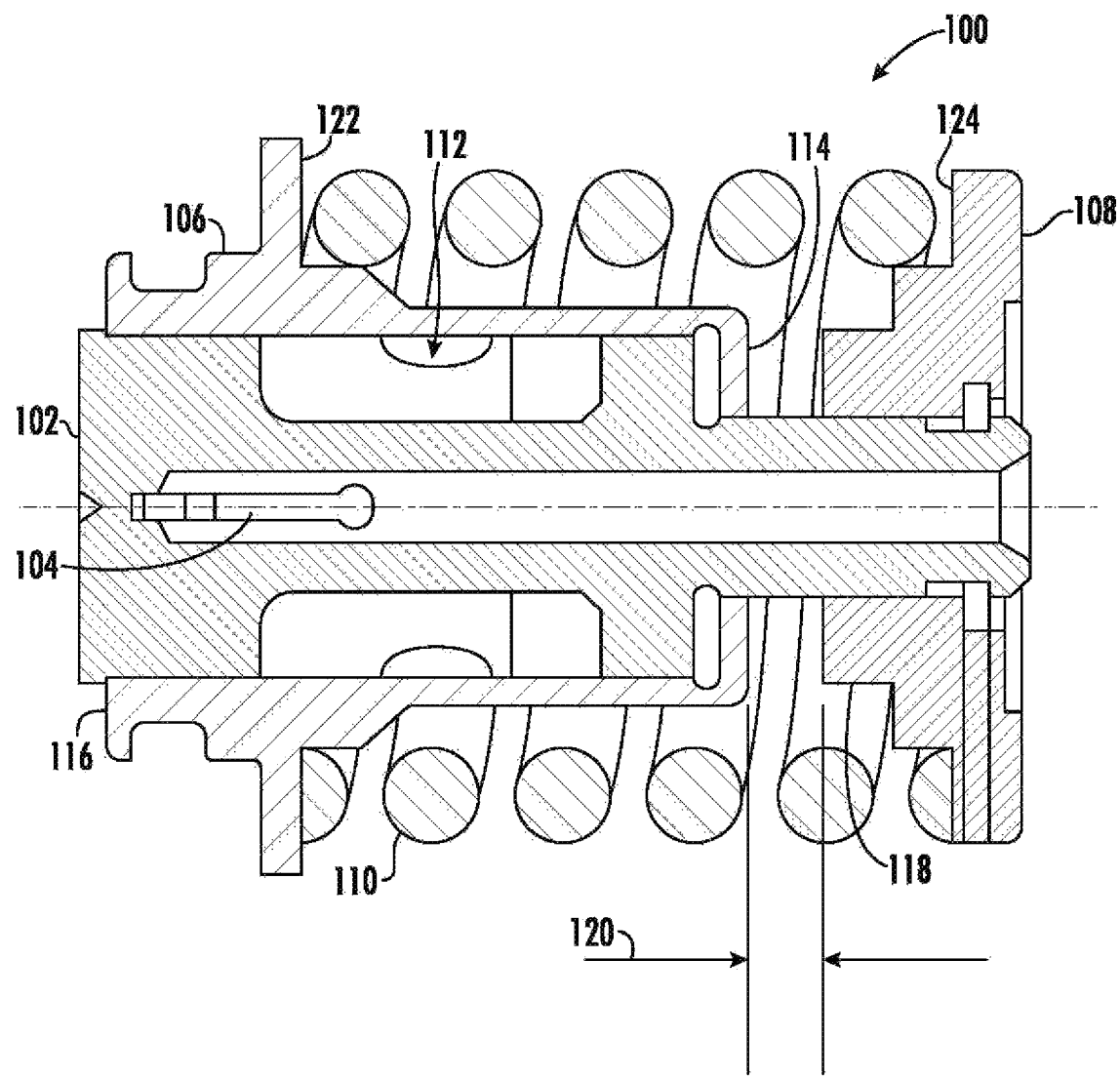
FIG. 1 is a cross-sectional view of a fuel nozzle metering valve with a flow-limiting feature, constructed in accordance with an embodiment of the invention.

FIG. 1 is a cross-sectional view of a fuel nozzle metering valve 100 with a flow-limiting feature, constructed in accordance with an embodiment of the invention. The metering valve 100 has a spring-loaded poppet, or spool 102, having one or more flow control ports 104, which moves back and forth within a sleeve or valve liner 106 in response to fuel flow pressure. The valve liner 106 is fixed within the fuel nozzle. A spring retainer 108 is assembled to one end of the spool 102 such that when the spool 102 moves within the valve liner 106, the spring retainer 108 moves with the spool 102. The spring retainer 108 is machined to limit spool displacement at a specified flow and fuel flow pressure. When the fuel nozzle metering valve 100 is operated as described, the spring-loaded spool 102 and spring retainer 108 operate to accurately set valve flow in a fixed geometry state.

In operation, fuel flows into metering valve 100 via inlet port 112 and exits the metering valve 100 through the one or more flow control ports 104 when the valve 100 is in the open position. When the fuel flow pressure is relatively low, the metering valve 100 is biased in the closed position. While various means for biasing the metering valve 100 may be used, FIG. 1 shows the biasing means as a spring 110 which closes the valve 100 such that there is no fuel flow through the metering valve 100. One end of the spring 110 abuts a valve liner flange 122 while the other end of the spring 110 abuts a spring retainer flange 124. In the embodiment of FIG. 1, fuel does not flow when the one or more flow control ports 104 are positioned inside of the valve liner 106. When the bias pressure is such that the spool 102 unseats from the valve liner 106, leakage flow occurs even though the one or more flow control ports 104 are still within the valve liner 106. However, when the pressure from fuel flowing into inlet port 112 increases, the flow control ports 104 start to slide out of the valve liner 106. As the flow control ports 104 extend beyond the second end 116 of the valve liner 106, fuel can flow out from the metering valve 100.

As the fuel flow pressure increases, a step 118 machined into the spring retainer 108 abuts the first end 114 of the valve liner 106 and acts as a flow-limiting feature. The step 118 portion of the spring retainer 108 extends toward the first end 114 of valve liner 106. In a particular embodiment, the spring retainer 108 is disc-shaped, and the step 118 extends from a central portion of the disc toward first end 114. The step 118 may be cylindrical or partially cylindrical. The spring retainer 108 is designed so that the step 118 abuts the first end 114, after some amount of spool displacement due to fuel flow pressure, well before the maximum fuel flow pressure is reached. Thus, for some portion of the fuel flow pressure, the flow geometry of the metering valve 100 is fixed. As a result, the fuel flow rate through the metering valve 100 is more predictable than in conventional fuel nozzles with conventional metering valves.

The space 120 indicated on FIG. 1 shows the maximum spool displacement. On one side of this space 120, the first end of valve liner 106 which limits the spool 102 in the open position. At the other side of space 120, spool displacement is limited by either the spool 102 abutting an interior portion of first end 114 maximum bias or by the maximum bias exerted by spring 110. The dimensions of the step 118 are designed to provide a specific fuel flow profile for each individual fuel nozzle.

Figure 2:
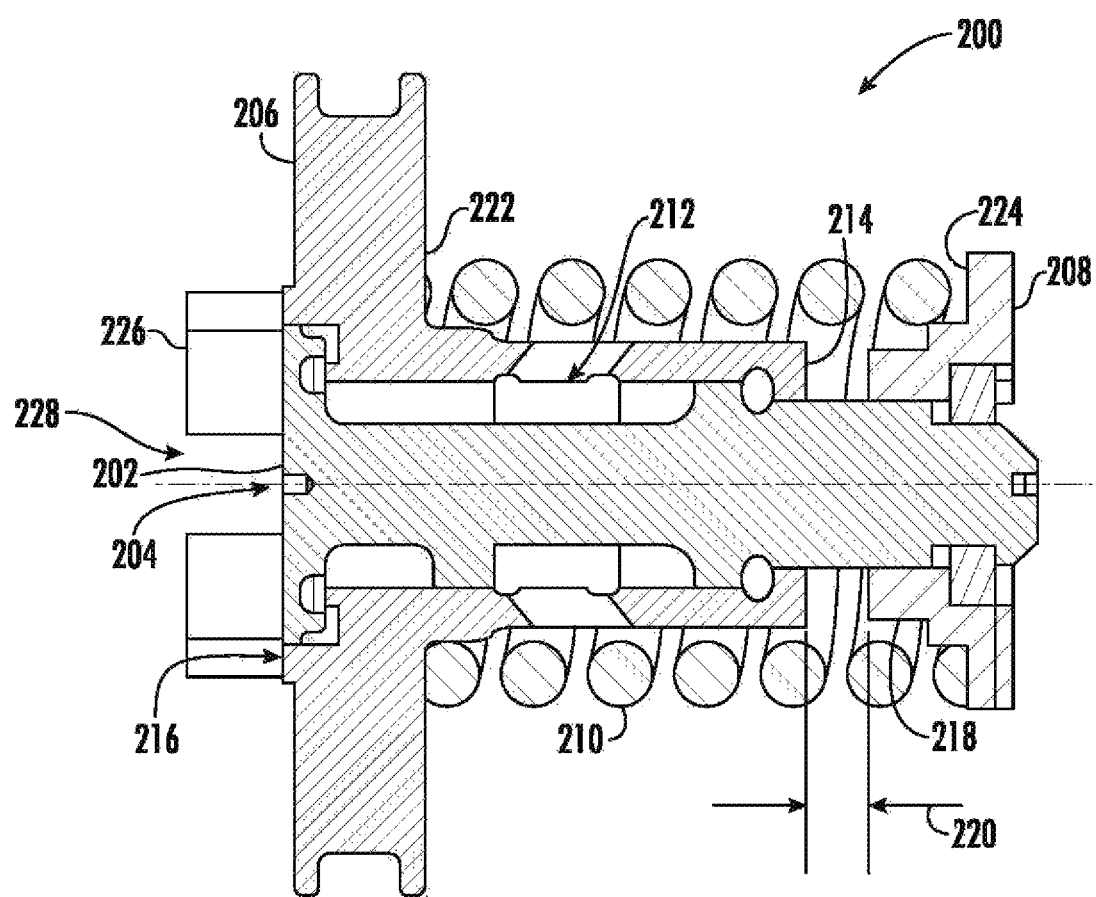
FIG. 2 is a cross-sectional view of a fuel nozzle check valve with a flow-limiting feature, constructed in accordance with an embodiment of the invention.

FIG. 2 is a cross-sectional view of a fuel nozzle check valve 200 with a flow-limiting feature, constructed in accordance with an embodiment of the invention. The check valve 200 has a similar arrangement, to that shown in FIG. 1, for limiting check valve assembly spool displacement. In this configuration, one or more outlet flow ports 204 are incorporated into the valve liner 206, but the basic concept remains the same as in the metering valve 100 of FIG. 1.

The spool 202 moves back and forth within the valve liner 206 in response to fuel flow pressure. The valve liner 206 position is fixed within the fuel nozzle. A spring retainer 208 is assembled to one end of the spool 202 such that when the spool 202 moves within the valve liner 206, the spring retainer 208 moves with the spool 202. The spring retainer 208 is machined to limit spool displacement at a specified flow and fuel flow pressure. As in the embodiment of FIG. 1, when the fuel nozzle check valve 200 is operated, the spring-loaded spool 202 and spring retainer 208 operate to accurately set valve flow in a fixed geometry state at less than the maximum expected fuel pressure.

In operation, the downstream diameter of spool 202 extends beyond the one or more outlet flow ports 204. Fuel flows into check valve 200 via inlet port 212 and exits the check valve 200 through one or more outlet flow ports 204 when the valve 200 is in the open position. When the fuel flow pressure is relatively low, the check valve 200 is biased in the closed position. Fuel does not flow when the check valve 200 is in the closed position due to the one or more outlet flow ports 204 being blocked by the spool 202. While various means for biasing the check valve 200 may be used, FIG. 2 shows the biasing means as a spring 210 which closes the valve 200 such that there is no fuel flow through the check valve 100. One end of the spring 210 abuts a valve liner flange 222 while the other end of the spring 210 abuts a spring retainer flange 224.

When the pressure from fuel flowing into inlet port 212 is sufficient to overcome the closing bias of spring 210, the spool 202 starts to slide out of the valve liner 206 while the spring retainer 208 is pulled toward a first end 214 of the valve liner 206. As the one or more outlet flow ports 204 extend beyond the second end 216 of the valve liner 206, fuel can flow out from the check valve 200. In the embodiment of FIG. 2, the one or more outlet flow ports 204 are disposed on a perimeter portion at an end of the valve liner 206. This end of the valve liner includes four projections 226 arranged cylindrically with four equally-spaced gaps 228, the four equally-spaced gaps 228 separating the four projections 226. When the spool 202 slides a sufficient distance out from the valve liner 206, fuel can flow from the one or more outlet flow ports 204 where the gaps 228 are situated.

As the fuel flow pressure increases, a step 218 machined into the spring retainer 208 abuts the first end 214 of the valve liner 206 and acts as a flow-limiting feature. The step 218 portion of the spring retainer 208 extends toward the first end 214 of valve liner 206.

In a particular embodiment, the spring retainer 208 is disc-shaped, and the step 218 extends from a central portion of the disc toward first end 214. The step 218 may be cylindrical or partially cylindrical. The spring retainer 208 is designed so that the step 218 abuts the first end 214, after some amount of spool displacement due to fuel flow pressure, well before the maximum fuel flow pressure is reached. Thus, for some portion of the fuel flow pressure, the flow geometry of the check valve 200 is fixed, making the fuel flow rate through the check valve 200 more predictable than in conventional fuel nozzles with conventional check valves.

As with FIG. 1, the space 220 indicated on FIG. 2 shows the maximum spool displacement. On one side of this space 220, the first end of valve liner 206 which limits the spool 202 in the open position. At the other side of space 220, spool displacement is limited by either the spool 202 abutting an interior portion of first end 214 maximum bias or by the maximum bias exerted by spring 210. The dimensions of the step 218 are designed to provide a specific fuel flow profile for each individual fuel nozzle.

The fuel flow tolerances of nozzles constructed in accordance with an embodiment of the invention were tested against the tolerance specification requirement for such fuel nozzles. The average min-max flow variation of 20 tested fuel nozzle assemblies, constructed in accordance with an embodiment of the invention, was 42 percent less than nominal specification requirement at the highest inlet pressure. This average min-max flow variation for the set of twenty nozzle assemblies through the range of operating pressures is shown in the graphical illustration of FIG. 3. The graph shows the percentage of flow variation as it relates to inlet pressure. The upper curve 250 depicts the flow variation specification for a typical fuel nozzle. The lower curve 252 shows the average flow variation for the 20 fuel nozzles constructed in accordance with an embodiment of the invention described herein.

Figure 3:
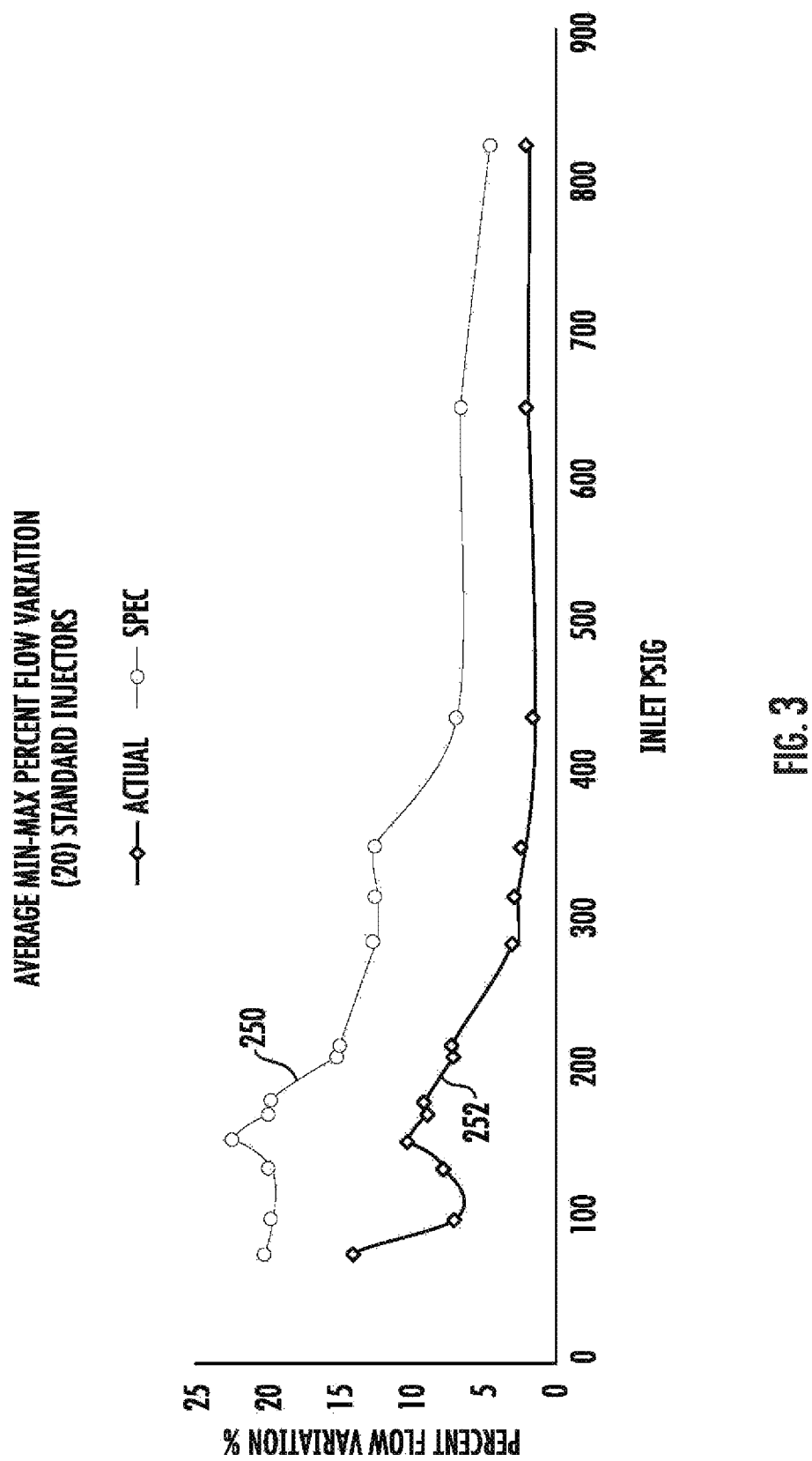
FIG. 3 is a graphical illustration showing an exemplary flow variation for an embodiment of the fuel nozzle disclosed herein.

As explained above, the fuel nozzle flow tolerance reduction, shown in FIG. 3, is achieved with fixed valve geometry at higher flow rates. Limiting valve displacement before maximum inlet pressure reached is how the fuel nozzle valves function to achieve this fixed geometry. Maximum valve displacement for each assembly is set at target flow and pressure, enabling repeatable flow rates that would otherwise depend on the compounding effect of component geometry variations.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A fuel nozzle metering valve comprising:
   a spool having an inlet port and a flow control port;
   a one-piece retainer assembled to one end of the spool, the one-piece retainer having a stepped portion extending from a central region thereof, the stepped portion having an axial length configured to limit spool displacement at a specified flow and a fuel flow pressure to accurately set valve flow in a fixed geometry state;
   a valve liner which houses a portion of the spool, the spool configured to move back and forth within the valve liner;
   wherein the metering valve is biased in a closed position in which the flow control port is disposed entirely within the valve liner, wherein the valve is opened when the spool slides out of the valve liner such that some portion of the flow control port extends beyond an end of the valve liner, the stepped portion configured to abut an end of the valve liner at the fuel flow pressure, which is below the expected maximum fuel flow pressure to be used in the fuel nozzle metering valve; and
   wherein the end of the valve liner on which the stepped portion of the retainer abuts engages an outer surface of the spool, the spool further including a flange formed on the outer surface thereof and positioned to engage an inner surface of the valve liner so as to form a dashpot between the stepped portion and the flange within the liner.

2. A fuel nozzle check valve comprising:
   a valve liner having an inlet port and an outlet flow port;
   a spool disposed within the valve liner;
   a one-piece retainer assembled to one end of the spool, the one-piece retainer having a stepped portion extending from a central region thereof, the stepped portion having an axial length configured to limit spool displacement at a specified flow and a fuel flow pressure to accurately set valve flow in a fixed geometry state;
   wherein the valve liner houses a portion of the spool, the spool configured to move back and forth within the valve liner, wherein the valve liner includes a valve liner port in fluid communication with the outlet flow port when the check valve is in the open position;
   wherein the check valve is biased in a closed position in which the outlet flow port is blocked when the spool is disposed entirely within the valve liner, wherein the check valve is opened when the spool slides out of the valve liner such that the outlet flow port is not blocked by the spool, the stepped portion of the retainer configured to abut an end of the valve liner at a fuel flow pressure below the expected maximum fuel flow pressure to be used in the fuel nozzle check valve; and wherein the end of the valve liner on which the stepped portion of the retainer abuts engages an outer surface of the spool, the spool further including a flange formed on the outer surface thereof and positioned to engage an inner surface of the valve liner so as to form a dashpot between the stepped portion and the flange within the liner.

\* \* \* \* \*